United States Patent
Miyake et al.

(10) Patent No.: US 9,013,531 B2
(45) Date of Patent: Apr. 21, 2015

(54) OPTICAL SCANNING DEVICE HAVING A SCANNING LENS WITH A TILT-DECENTERED SURFACE AND IMAGE FORMING APPARATUS

(71) Applicants: Shinsuke Miyake, Saitama (JP); Shigeaki Imai, Kanagawa (JP)

(72) Inventors: Shinsuke Miyake, Saitama (JP); Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/795,534

(22) Filed: Mar. 12, 2013

(65) Prior Publication Data
US 2013/0235144 A1   Sep. 12, 2013

(30) Foreign Application Priority Data
Mar. 12, 2012   (JP) ................................. 2012-054775

(51) Int. Cl.
| | |
|---|---|
| *B41J 15/14* | (2006.01) |
| *B41J 27/00* | (2006.01) |
| *G03G 15/04* | (2006.01) |
| *G02B 26/10* | (2006.01) |
| *G02B 3/00* | (2006.01) |
| *G02B 26/12* | (2006.01) |
| G03G 15/043 | (2006.01) |
| G02B 13/00 | (2006.01) |

(52) U.S. Cl.
CPC .......... *G03G 15/04036* (2013.01); *G02B 26/10* (2013.01); *G03G 15/0435* (2013.01); *G02B 13/0005* (2013.01); *G02B 3/0087* (2013.01); *G02B 26/125* (2013.01)

(58) Field of Classification Search
USPC ........ 347/244, 258; 359/205.1–207.11, 215.1
See application file for complete search history.

(56) References Cited

U.S. PATENT DOCUMENTS

| | | | |
|---|---|---|---|
| 7,277,212 B2 * | 10/2007 | Miyatake et al. .......... 359/220.1 |
| 2004/0165240 A1 | 8/2004 | Suzuki et al. |
| 2004/0240000 A1 | 12/2004 | Miyatake et al. |
| 2005/0094234 A1 | 5/2005 | Miyatake et al. |
| 2005/0190420 A1 | 9/2005 | Imai et al. |
| 2006/0158711 A1 | 7/2006 | Imai et al. |
| 2007/0058255 A1 | 3/2007 | Imai et al. |
| 2007/0236557 A1 | 10/2007 | Imai et al. |
| 2008/0019255 A1 | 1/2008 | Imai et al. |
| 2008/0068678 A1 | 3/2008 | Suzuki et al. |

(Continued)

FOREIGN PATENT DOCUMENTS

JP     2007-025536    2/2007

OTHER PUBLICATIONS

U.S. Appl. No. 13/716,944, filed Dec. 17, 2012, Miyake, et al.

*Primary Examiner* — Hai C Pham
(74) *Attorney, Agent, or Firm* — Oblon, McClelland, Maier & Neustadt, L.L.P.

(57) ABSTRACT

An optical device includes: a light source that emits a light beam; a deflector that deflects the light beam in a main-scanning direction; and a scanning/image-forming optical system that includes a scanning lens that causes the light beam deflected by the deflector to converge to a scanned surface to form an image on the scanned surface. The scanning lens has refractive index gradient. At least one surface of the scanning lens is a tilt-decentered surface that has a tilt angle, which depends on a position in the main-scanning direction, in a sub-scanning direction. The tilt angle is set so as to compensate for variation, which results from the refractive index gradient, in direction of the light beam in the sub-scanning direction.

7 Claims, 6 Drawing Sheets

(56) References Cited

U.S. PATENT DOCUMENTS

| | | |
|---|---|---|
| 2008/0170283 A1 | 7/2008 | Imai |
| 2008/0192323 A1 | 8/2008 | Nakamura et al. |
| 2008/0259426 A1 | 10/2008 | Imai |
| 2009/0058979 A1 | 3/2009 | Saisho et al. |
| 2009/0073529 A1 | 3/2009 | Imai |
| 2009/0073531 A1 | 3/2009 | Imai |
| 2009/0074437 A1 | 3/2009 | Tanabe et al. |
| 2009/0225385 A1 | 9/2009 | Imai |
| 2009/0231654 A1 | 9/2009 | Imai |
| 2009/0303451 A1 | 12/2009 | Miyake et al. |
| 2010/0060963 A1 | 3/2010 | Miyake et al. |
| 2010/0310284 A1 | 12/2010 | Funato et al. |
| 2011/0102536 A1 | 5/2011 | Imai |
| 2012/0027450 A1 | 2/2012 | Imai |
| 2012/0056968 A1 | 3/2012 | Imai et al. |
| 2012/0182367 A1 | 7/2012 | Masuda et al. |

* cited by examiner

OPTICAL SCANNING DEVICE HAVING A SCANNING LENS WITH A TILT-DECENTERED SURFACE AND IMAGE FORMING APPARATUS

CROSS-REFERENCE TO RELATED APPLICATIONS

The present application claims priority to and incorporates by reference the entire contents of Japanese Patent Application No. 2012-054775 filed in Japan on Mar. 12, 2012.

BACKGROUND OF THE INVENTION

1. Field of the Invention

The present invention relates to an optical scanning device and an image forming apparatus.

2. Description of the Related Art

From a viewpoint of cost reduction of an optical scanning device, a scanning lens, which is one of optical elements that make up the optical scanning device, forms a large proportion of the cost. Cost of the scanning lens chiefly depends on length of time necessary for molding the scanning lens. Put another way, the shorter the molding time, the less the cost. Meanwhile, molding of a scanning lens is typically performed by injecting heated and softened resin into a molding die and fill the die with the resin. During this molding, refractive index gradient that depends on the molding time is produced in the scanning lens. Such refractive index gradient in the scanning lens generally degrades optical performance. Causes of the degradation in optical performance include scan line bow.

FIG. 1 is a explanatory schematic diagram of "refractive index gradient in a lens" of a scanning lens 234 (see FIG. 5). FIG. 1(a) illustrates refractive index gradient in a main-scanning cross section of the scanning lens 234 "in a contour map form". The refractive index changes along a dash-dot line of FIG. 1(b) in such a manner that the refractive index gradually increases from a center portion of the lens toward both end portions (in the main-scanning direction) of the lens as illustrated in FIG. 1(b). FIG. 1(c) illustrates refractive index gradient in a sub-scanning cross section (planar cross section containing the optical axis of the scanning lens 234 and parallel to the sub-scanning direction) of the scanning lens 234 in a contour map form. FIG. 1(d) illustrates how the refractive index on the optical axis changes in the sub-scanning cross section. FIG. 1(e) illustrates the refractive index gradient in the sub-scanning direction in the sub-scanning cross section.

As illustrated in FIG. 1(e), the refractive index gradient in the sub-scanning direction is graded in such a manner that "the refractive index increases as the distance from the optical axis in the sub-scanning direction increases". This tendency of the refractive index gradient in the sub-scanning direction that "the refractive index increases as the distance from the optical axis increases in the sub-scanning direction" is not specific to the sub-scanning cross section of the scanning lens 234 but common to any planar cross section parallel to the sub-scanning cross section.

However, "the greater the distance in the main-scanning direction" from the optical axis of the scanning lens 234, the smaller the refractive index change (i.e., a difference between a refractive index in the main-scanning cross section and a refractive index of edge portions in the sub-scanning direction) in the refractive index gradient in the sub-scanning direction becomes. This is readily understood from FIG. 1(a), in which the greater the distance from the optical axis, the greater "the intervals between contour lines of the refractive index" and the change in the refractive index becomes smaller.

The scan line bow, which is a problem to be solved by of the present invention, is chiefly affected by the refractive index gradient in the sub-scanning direction (see FIG. 1(e)) among the refractive index gradients described above. Effect of the refractive index gradient in the sub-scanning direction on the optical performance scanning lens 234 manifests itself as "variation of imaging focal length in the sub-scanning direction".

Here, it is assume that the scanning lens 234 has such refractive index gradient as that illustrated in FIG. 2. Illustrated in FIG. 2 is an example for reference purpose where the refractive index is uniform. FIG. 2 is a diagram indicating dependence of differential of refractive index change (first-order derivative of the refractive index change) in the sub-scanning direction on lens height. The lens height is a position in the lens in the main-scanning direction. The lens height is zero on the optical axis in the main-scanning direction.

When the refractive index is uniform, the differential of the refractive index change is constant. In this case, a scan line bow that is 25 μm maximum occurs as illustrated in FIG. 3. This scan line bow leads to degradation of quality of output images of the optical scanning device.

Measures for correcting scan line bow that occurs in what is referred to as an oblique incidence optical system have already been proposed (see Japanese Patent Application Laid-open No. 2007-025536, for example).

Therefore, it is desirable to provide an optical scanning device capable of preventing degradation in quality in output images even when the optical scanning device includes a scanning lens that has refractive index gradient, and an image forming apparatus including the optical scanning device.

SUMMARY OF THE INVENTION

It is an object of the present invention to at least partially solve the problems in the conventional technology.

According to an aspect of the present invention, there is provided an optical scanning device including: a light source that emits a light beam; a deflector that deflects the light beam emitted from the light source in a main-scanning direction; and a scanning/image-forming optical system that includes a scanning lens that causes the light beam deflected by the deflector to converge to a scanned surface to form an image on the scanned surface, wherein the scanning lens has refractive index gradient, at least one surface of the scanning lens is a tilt-decentered surface that has a tilt angle in a sub-scanning direction, the tilt angle depending on a position in the main-scanning direction, and the tilt angle is set so as to compensate for variation in direction of the light beam in the sub-scanning direction, the variation resulting from the refractive index gradient.

According to another aspect of the present invention, there is provided an image forming apparatus including: an image carrier; and an optical writing device that performs optical writing on the image carrier to form an electrostatic latent image on the image carrier by electrophotography, wherein the optical writing device includes: a light source that emits a light beam; a deflector that deflects the light beam emitted from the light source in a main-scanning direction; and a scanning/image-forming optical system that includes a scanning lens that causes the light beam deflected by the deflector to converge to a scanned surface to form an image on the scanned surface, wherein the scanning lens has refractive index gradient, at least one surface of the scanning lens is a tilt-decentered surface that has a tilt angle in a sub-scanning direction, the tilt angle depending on a position in the main-scanning direction, and the tilt angle is set so as to compensate for variation in direction of the light beam in the sub-scanning direction, the variation resulting from the refractive index gradient.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

An image forming apparatus according to the embodiments is described first.

Figure 4:
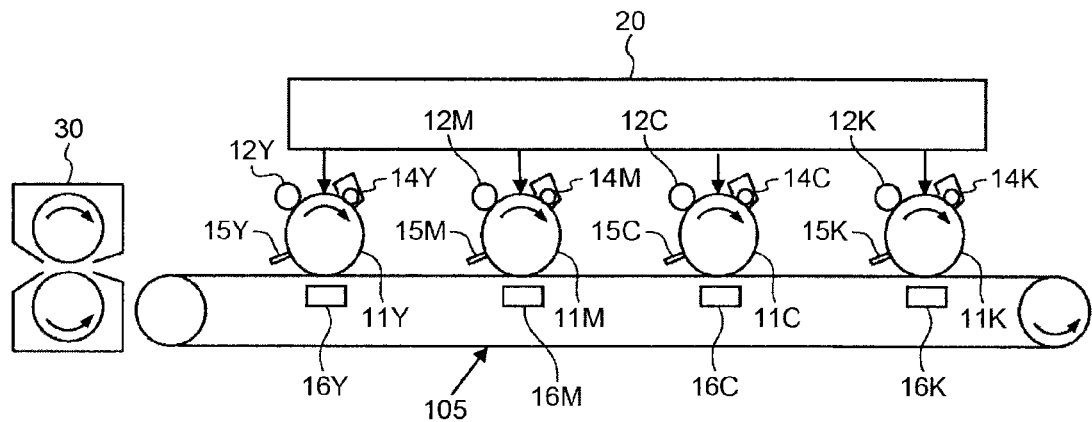
FIG. 4 is a center cross section illustrating an image forming apparatus according to an embodiment of the present invention.

FIG. 4 is a center cross section illustrating the image forming apparatus according to the embodiment. The image forming apparatus is a tandem laser printer that is advantageous for high-speed color image forming. The image forming apparatus includes an optical scanning device 20 that includes a scanning optical system for cyan (C), that for magenta (M), that for black (K), and that for yellow (Y), photosensitive elements 11X (X: Y, M, C, K) associated with one of the scanning optical systems, a transfer belt 105, a fixing device 30, a paper cassette (not shown) containing transfer paper (not shown), and a paper output tray (not shown).

The photosensitive element 11Y for yellow, the photosensitive element 11M for magenta, the photosensitive element 11C for cyan, and the photosensitive element 11K for black are arranged above the transfer belt 105 in this order from upstream to downstream in a moving direction of the transfer belt 105. The photosensitive element 11X is a photoconductive cylindrical image carrier on which an electrostatic latent image is to be formed by exposure performed by the optical scanning device 20. The photosensitive elements 11X have a same diameter.

Processing members including an electrostatic charger 12X, a developing unit 14X, a transfer roller 16X, and a cleaning device 15X for use in electrophotography (electrophotographic processing) are arranged in order around the photosensitive element 11X. A corona charger can be used as the electrostatic charger.

Registration rollers (not shown) and a belt charger (not shown) are arranged around the transfer belt 105 at positions upstream of the photosensitive element 11X with respect to a transfer-paper conveying path. A belt separating charger (not shown), a neutralizing charger (not shown), and a cleaning device (not shown) are arranged around the transfer belt 105 at positions downstream of the photosensitive element 11X with respect to the transfer-paper conveying path.

As described above, the image forming apparatus includes scanned surfaces which are surfaces of the photosensitive elements 11Y, 11M, 11C, and 11K for the respective colors, and the scanning optical systems which are associated with the scanned surfaces one by one. However, one or more optical elements, the light deflector, for example, that make up the scanning optical system may be shared between scanning optical systems of different colors.

The optical scanning device 20 is an optical writing device that performs optical writing on the photosensitive element 11X and performs an exposure process of the electrophotographic processing. The optical scanning device 20 scans the surface of the photosensitive element 11X that is uniformly charged by the electrostatic charger 12X to form an electrostatic latent image on the surface. The formed electrostatic latent image is what is referred to as a negative latent image, of which image portion has been exposed. The electrostatic latent image is developed by the developing unit 14X in a write-white manner. As a result, a toner image is formed on the photosensitive element 11X.

The optical scanning device 20 corresponds to an optical scanning device of the present invention, which will be described later.

An uppermost sheet of the transfer paper stored in the paper cassette is fed by a sheet feeding roller (not shown). A leading end of the picked-up transfer paper is caught between the registration rollers. The registration rollers deliver the transfer paper to a transfer unit at timing synchronized to moving of the toner image on the photosensitive element 11X to a transfer position. In the transfer unit, the toner image is overlaid on the delivered transfer paper and electrostatically transferred by the transfer roller 16X onto the transfer paper.

The transfer paper onto which the toner image is transferred is conveyed to the fixing device 30. In the fixing device 30, the toner image is fixed onto the transfer paper. The transfer paper is then conveyed along a conveying path (not shown) and output onto the output tray by paper output rollers (not shown). The cleaning device 15X cleans the surface of the photosensitive element 11X, from which the toner image has been transferred, to remove residual toner, paper powder, and the like from the surface.

When the image forming apparatus configured as described above is in, for example, a multiple-color mode (full-color mode), each of the photosensitive elements is exposed to light according to an image signal for corresponding one of the colors by an exposure unit (not shown). As a result, an electrostatic latent image is formed on each of the photosensitive elements. Each of the electrostatic latent images is developed into a toner image with toner of the corresponding color. The toner images are electrostatically attracted onto the transfer belt 105 and sequentially transferred onto transfer paper that is conveyed, thereby being overlaid on one another. The fixing device 30 fixes the toner images as a full-color image onto the transfer paper. The transfer paper is then output onto the paper output tray.

When the image forming apparatus is in a single-color mode, the photosensitive elements and processing members for other colors than a designated color X (which is any one of Y, M, C, and K) are put on a non-operating state. The exposure unit exposes only the photosensitive element 11X to light to form an electrostatic latent image thereon. The electrostatic latent image is developed into a toner image with toner of the designated color X. The toner image is electrostatically attracted onto the transfer belt 105, and transferred onto transfer paper that is conveyed. The toner image is fixed by the fixing device 30 as a single-color image onto the transfer paper. The transfer paper is output onto the paper output tray.

An optical scanning device according to an embodiment of the present invention is described below.

Figure 5:
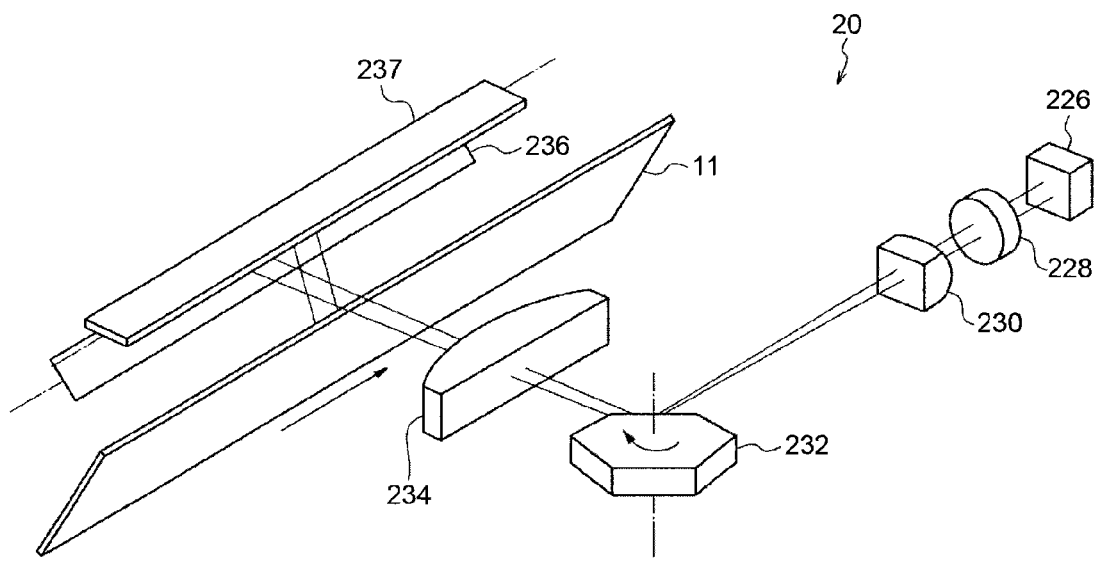
FIG. 5 is an optical layout diagram illustrating an optical scanning device according to an embodiment of the present invention.

FIG. 5 is an optical layout diagram illustrating the optical scanning device 20 according to the embodiment. A laser diode 226 is a light source unit. A light deflector 232 deflects a light beam emitted from the laser diode 226 so as to perform scanning. A coupling lens 228 couples the light beam emitted from the laser diode 226 to the light deflector 232. A cylindrical lens 230 is a linear-image-forming optical system. A scanning lens 234 is a constituent of a scanning optical system (scanning/image-forming optical system) and converges the light beam deflected by the light deflector 232 to the surface of a photosensitive element 11 which is a scanned surface. Light redirecting mirrors 236 and 237 redirect the light beam converged by the scanning lens 234 so that the light beam enters the photosensitive element 11. A cover glass CG (see FIGS. 9 to 11) through which the light beam reflected from the light redirecting mirror 236 is to travel is provided on an optical path between the light redirecting mirror 236 and the photosensitive element 11.

The light deflector 232 is a polygonal rotating mirror such as a polygon mirror and rotated by a driving mechanism (not shown) about a rotation axis in a direction indicated by an arrow in FIG. 5 at a constant angular velocity.

In the following description, a direction in which the light beam emitted from the laser diode 226 is deflected by the light deflector 232 to perform scanning is referred to as the main-scanning direction, and the direction perpendicular to the main-scanning direction is referred to as the sub-scanning direction.

The coupling lens 228 couples a diverging light beam emitted from the laser diode 226 to a beam shape appropriate for an optical system downstream of the coupling lens 228. Meanwhile, the coupled light beam has a same beam form which can be either "parallel beam" or "converging or diverging beam".

The light beam passed through the coupling lens 228 reaches aperture (not shown) that limits the width of the light beam. The light beam is then converged by the cylindrical lens 230 to form an image, which is a linear image in the main-scanning direction, near a deflective reflection facet of the light deflector 232.

The light deflector 232 deflects the incident light beam with the constant angular velocity. The light beam emitted from the laser diode 226 and deflected by the light deflector 232 passes through the scanning lens 234, and is then redirected by the light redirecting mirrors 237 and 236 to enter the photosensitive element 11 to form a beam spot on the surface of the photosensitive element 11 which is the scanned surface. As the light deflector 232 rotates, the beam spot scans the scanned surface. The size of the beam spot depends on the aperture arranged on the optical path at a position between the coupling lens 228 and the cylindrical lens 230.

As described above, when the scanning lens has the refractive index gradient, degradation in optical performance of the optical scanning device, or, more specifically, degradation in quality of output images of the optical scanning device resulting from scan line bow and the like occurs. However, according to an aspect of the present invention, the scanning lens is configured as a special lens, and a tilt angle of the special lens is set appropriately, which will be described later, thereby preventing such degradation in optical performance.

The "special lens" is a generic name for any scanning lens including at least one lens surface (hereinafter, "special surface") that has a non-arcuate meridional line (a curve of intersection of a surface of the scanning lens and a plane parallel to the main-scanning plane and containing the optical axis) and has a cross-sectional profile, which is taken along a plane parallel to the sub-scanning plane, that varies along the meridional line.

First Implementation Example

Figure 2:
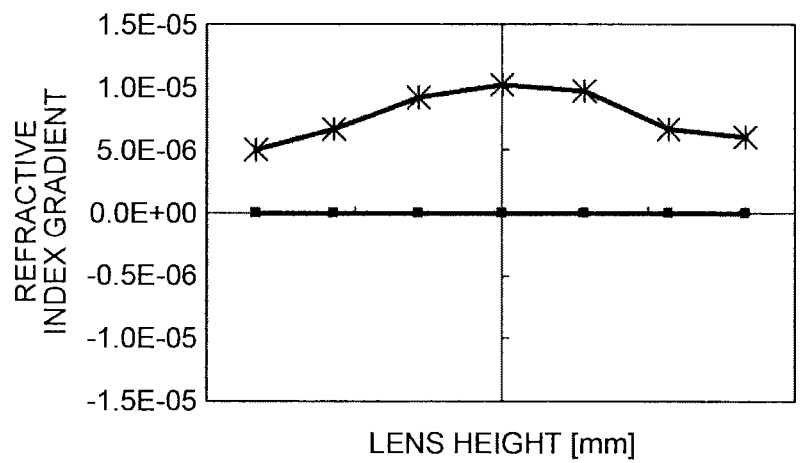
FIG. 2 is a diagram illustrating dependence of differential of the refractive index gradient in the sub-scanning direction on lens height.
Figure 3:
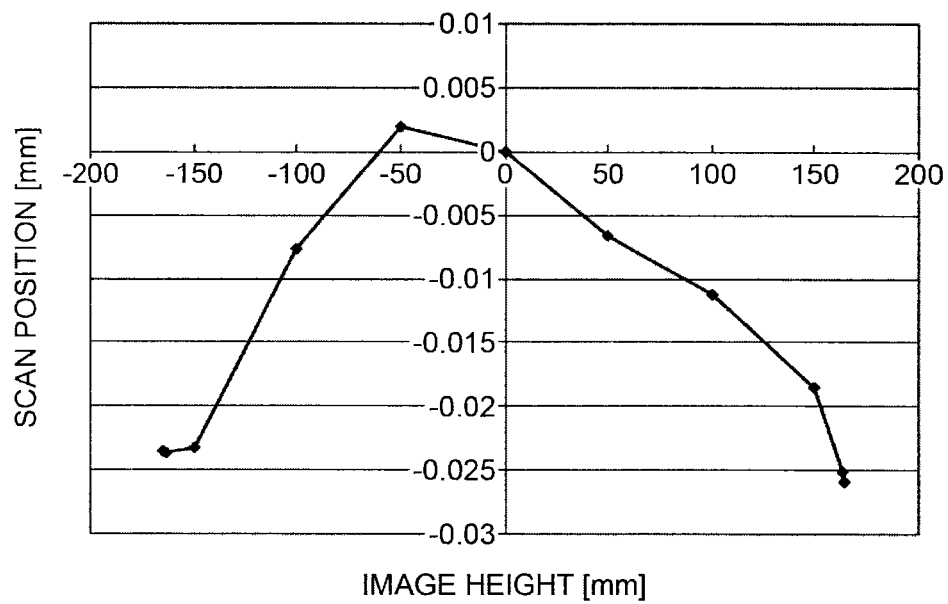
FIG. 3 is a diagram illustrating an example of scan line bow resulting from the refractive index gradient.
Figure 6:
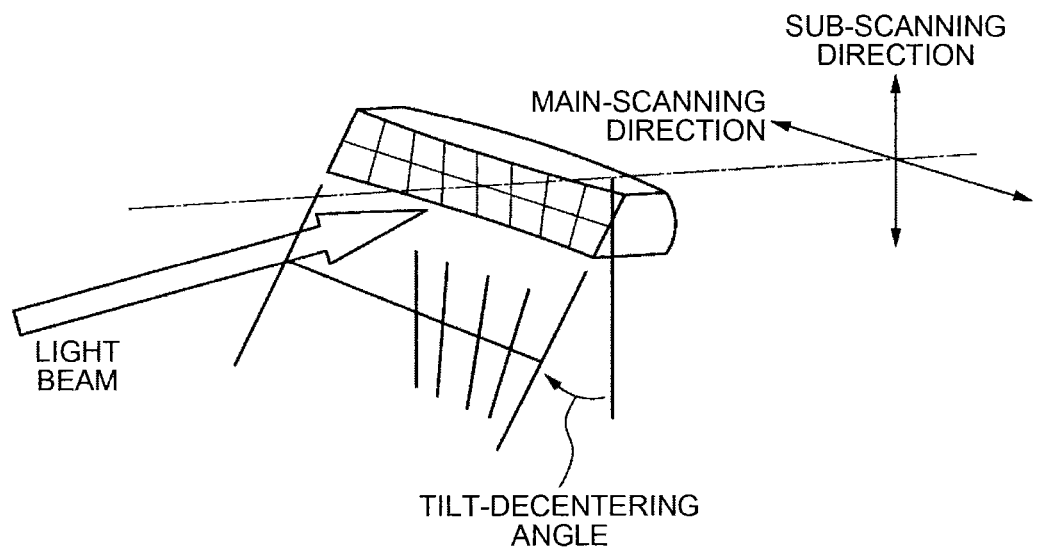
FIG. 6 is an explanatory diagram of a tilt-decentered surface of a scanning lens of the optical scanning device.

The scanning lens 234 of a first implementation example has such a refractive index gradient as that illustrated in FIG. 2. However, because the special surface is applied to the scanning lens 234, scan line bow resulting from the refractive index gradient is corrected. Meanwhile, it is possible to correct scan line bow by tilt-decentering a lens surface in the sub-scanning direction. A tilt-decentering angle of this tilt-decentered surface is set in such a manner that the tilt-decentering angle increases from a portion near the center of the scanning lens 234 to outer periphery of the scanning lens 234, or vice versa. In the present invention, as illustrated in FIG. 6, scan position in the sub-scanning direction is corrected for each image height by balancing scan positions among across image heights, thereby correcting scan line bow on the scanned surface.

The special surface is further described below. The surface shape of the special surface is expressed by Shape Equation (1) below. It should be noted that the surface shape of the special surface of the present invention is not limited to that expressed by Shape Equation (1), and the same surface shape can be defined using another shape equation.

$$X(Y, Z) = \frac{Y^2 \cdot Cm}{1 + \sqrt{1 - (1+K) \cdot (Y \cdot Cm)^2}} + A \cdot Y^4 + B \cdot Y^6 + C \cdot Y^8 + D \cdot Y^{10} + E \cdot Y^{12} + \ldots + \frac{Cs(Y) \cdot Z^2}{1 + \sqrt{1 - (Cs(Y) \cdot Z)^2}} + (F0 + F1 \cdot Y + F2 \cdot Y^2 + F3 \cdot Y^3 + F4 \cdot Y^4 + \ldots) \cdot [Z - Z0(Y)] \quad (1)$$

In Equation (1),

RY: the paraxial curvature radius in "the main-scanning cross section", which is a planar cross section containing the optical axis and parallel to the main scanning direction, Y: the distance from the optical axis in the main scanning direction, A, B, C, D, . . . : higher-order coefficients, RZ: the paraxial curvature radius in "the sub-scanning cross section" perpendicular to the main-scanning cross section, $$Z0(Y)=d00+d01 \cdot Y+d02 \cdot Y^2+d03 \cdot Y^3+d04 \cdot Y^4+ \ldots,$$

$$Cm=1/RY, \text{ and}$$

$$Cs(Y)=1/RZ.$$

Of Equation (1), $(F0+F1 \cdot Y+F2 \cdot Y^2+F3 \cdot Y^3+F4 \cdot Y^4+ \ldots)Z$ represents the tilt angle. When the special surface does not have a tilt angle, F0, F1, F2, . . . are all zero. When any one of F0, F1, F2, . . . is not zero, a tilt angle that causes the special surface to tilt in the main scanning direction is obtained.

The special surface of the scanning lens 234 is a tilt-decentered surface that is tilted in the sub-scanning direction at a tilt angle that depends on the position in the main-scanning direction. The tilt angle is set so as to compensate for variation in direction of the light beam in the sub-scanning direction resulting from the refractive index gradient of the scanning lens 234. Put another way, the scan line bow correction can be achieved by appropriately setting the tilt angle of the special surface of the scanning lens 234.

TABLE 1

(a) Surface shape coefficients of first surface of scanning lens

| | |
|---|---|
| F0 | 5.05E−05 |
| F2 | −1.04E−07 |
| F4 | 5.11E−11 |
| F6 | −1.66E−14 |
| F8 | 2.41E−18 |

(b) Surface shape coefficients of second surface of scanning lens

| | |
|---|---|
| F0 | 5.19E−05 |
| F2 | 5.35E−08 |
| F4 | −1.06E−11 |
| F6 | 2.76E−15 |
| F8 | −3.27E−19 |

Presented in TABLE 1 are coefficients employed in the first implementation example. More specifically, contained in (a) are surface shape coefficients of a first surface of the scanning lens 234, and contained in (b) are surface shape coefficients of a second surface of the scanning lens 234. In the first implementation example, both the first surface and the second surface of the scanning lens are the special surfaces. However, scan line bow can be corrected even when the special surface is applied to only any one surface of the scanning lens.

Figure 1:
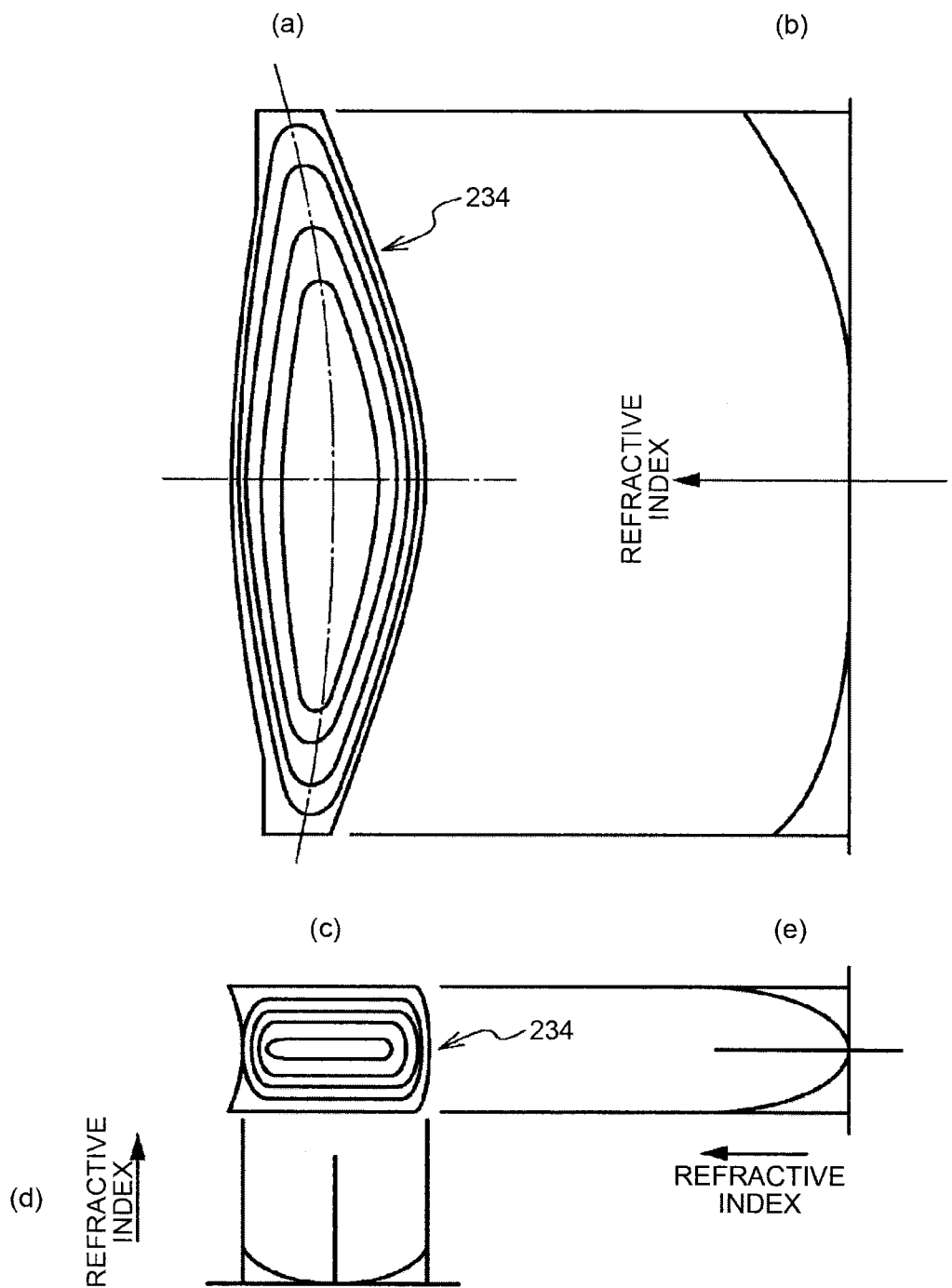
FIG. 1 is a schematic diagram each illustrating refractive index gradient in a scanning lens.
Figure 7:
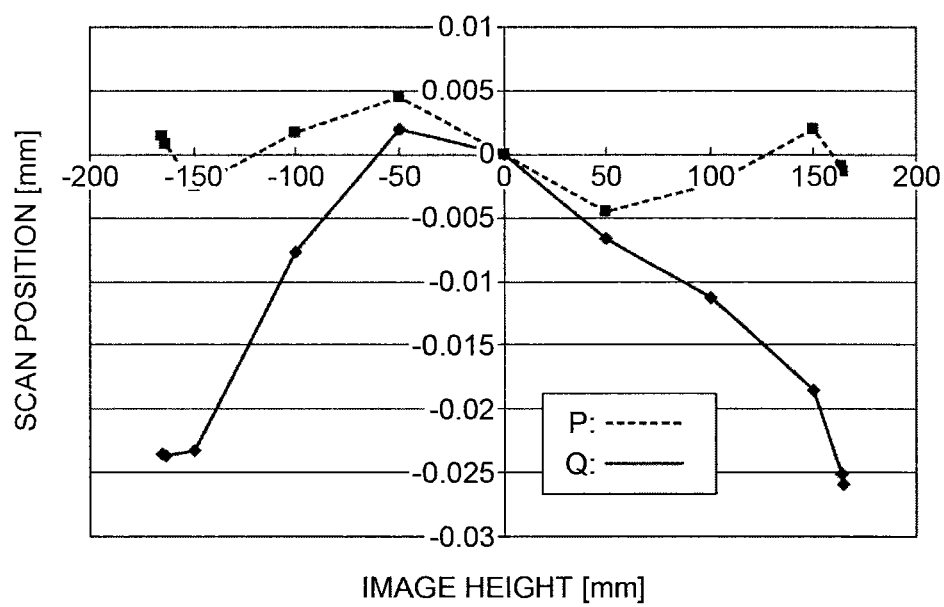
FIG. 7 is a diagram illustrating an example of scan line bow that occurs with the scanning lens including the tilt-decentered surface.

FIG. 7 is a diagram illustrating scan line bow (indicated by P in the graph) that occurs with the scanning lens 234 including the special surfaces. For reference, scan line bow (indicated by Q in the graph) that occurs with the scanning lens (FIG. 1) that does not include the special surface is also presented. FIG. 7 indicates that applying the special surfaces to the scanning lens reduces the scan line bow to no more than 5 μm as compared to 25 μm maximum, which is the scan line bow that occurs with the scanning lens that does not include the special surface.

Second Implementation Example

In the first implementation example described above, the special surface is implemented by tilt-decentering each of the surfaces of the scanning lens. In contrast, in a second implementation example, the special surface is implemented by shift decentering. As will be described later, the scan line bow correction can be achieved by shift decentering the special surface of the scanning lens 234.

In the second implementation example, the special surface is shift decentered in such a manner that a shift-decentering distance in the sub-scanning direction varies in the main-scanning direction, so that the direction of light beam varies in the sub-scanning direction. This special surface can be obtained by providing coefficients to d00, d01, and d02 of Equation (1) described above.

Figure 8:
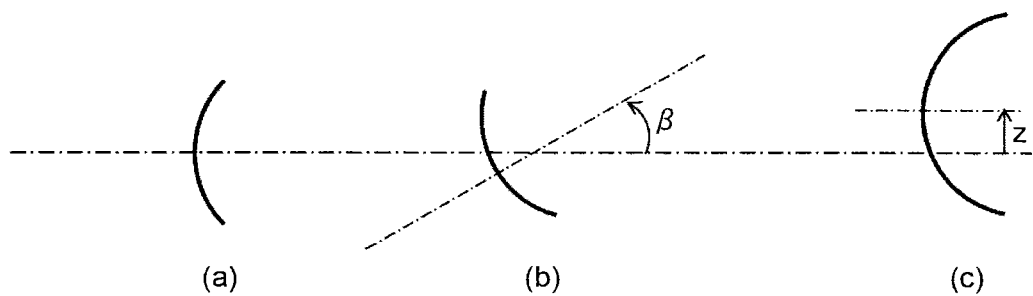
FIG. 8 is a diagram illustrating relation between a shift-decentering distance of the scanning lens and a change of a light beam in the sub-scanning direction.

FIG. 8 is a diagram for illustrating relation between a shift-decentering distance and a change of a light beam in the sub-scanning direction. FIG. 8(a) illustrates a case where the scanning lens has no special surface; FIG. 8(b) illustrates a case where the scanning lens has a tilt-decentering angle β; FIG. 8(c) illustrates a case where the scanning lens has a shift-decentering distance Z. FIGS. 8(a) and 8(b) are illustrated as reference examples for comparison.

By optimally setting the shift-decentering distance for a shift in the sub-scanning direction in the main-scanning direction, it becomes possible to deflect a light beam for use in scanning in the main-scanning direction in a desired (sub-scanning direction) direction. As a result, scan line bow correction can be achieved.

Third Implementation Example

Figure 9:
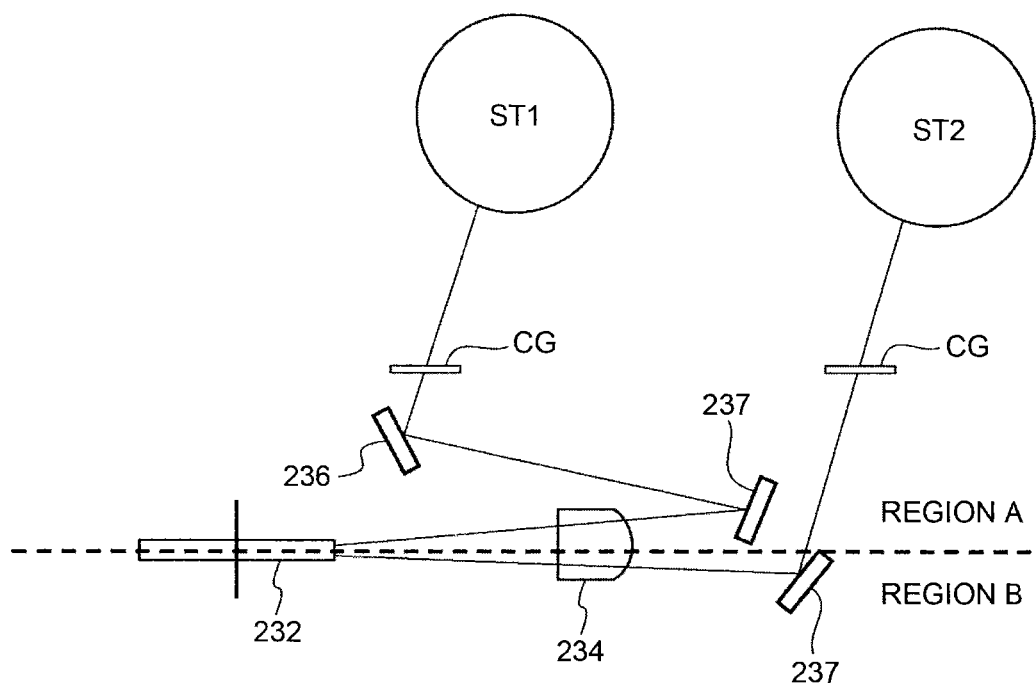
FIG. 9 is a diagram illustrating an example of a plurality of light beams passing through a scanning lens (one surface of which is a non-special surface) to obliquely strike a deflector of the optical scanning device.

As illustrated in FIG. 9, the optical scanning device according the embodiments may be configured such that a plurality of light source units emit light beams that strike the deflective reflection facet obliquely in the sub-scanning direction with respect to the normal of the deflective reflection facet of the light deflector 232 to be reflected from the deflective reflection facet. Employment of such what is referred to as an oblique incidence optical system allows reducing the width of the light deflector, which forms a large proportion in cost among components of the optical scanning device, as compared with a configuration in which light beams parallel to the normal strike the light deflector 232. Accordingly, such an oblique incidence optical system is effective in cost reduction of the optical scanning device.

The light beams emitted from the plurality of light source units (not shown) obliquely strike a same deflective reflection facet of the same light deflector 232. The light beams strike the deflective reflection facet from opposite sides in the sub-scanning direction with respect to the normal of the deflective reflection facet (i.e., from a region A on an upper side in FIG. 9 and a region B on a lower side). All the light beams pass through the same scanning lens 234 without passing through or across the optical axis of the scanning lens 234. Thereafter, the light beams are separated and redirected by the light redirecting mirrors in the sub-scanning direction so that each of the light beams enters corresponding one of the photosensitive elements (ST1, ST2) which are the scanned surfaces.

It is known that when the oblique incidence optical system is employed, scan line bow is likely to occur. However, as described above, the scan line bow caused by the oblique incidence system can be reduced by applying the special surface to the scanning lens 234 and appropriately setting the tilt angle of the special surface.

Fourth Implementation Example

Figure 10:
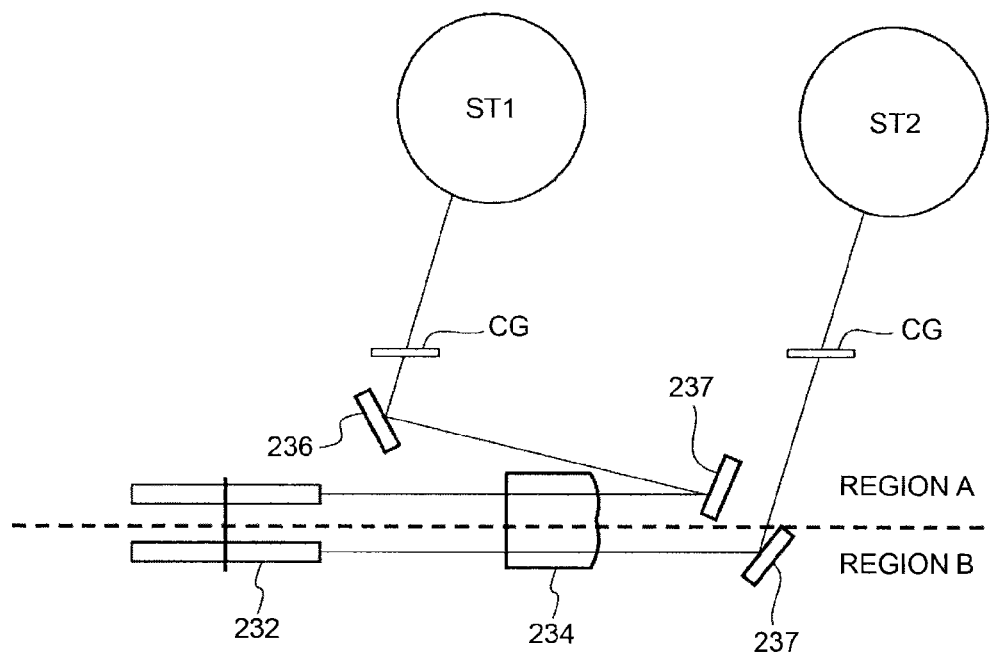
FIG. 10 is a diagram illustrating an example of a plurality of light beams passing through a scanning lens to strike the deflector of the optical scanning device parallel to each other.

As illustrated in FIG. 10, in the optical scanning device according the embodiments, the special surface may be applied to a scanning lens that has a plurality of meridional lines on each of its optical surfaces, or, in short, that is a double-layer lens. The double-layer lens is effective in cost reduction of the scanning lens.

When the scanning lens is such a double-layer lens, the refractive index gradient of the scanning lens becomes large because a double-layer lens is thicker in the sub-scanning direction as compared with a single-layer lens. However, as described above, the scan line bow can be reduced by applying the special surface to the scanning lens and appropriately setting the tilt angle.

Figure 11:
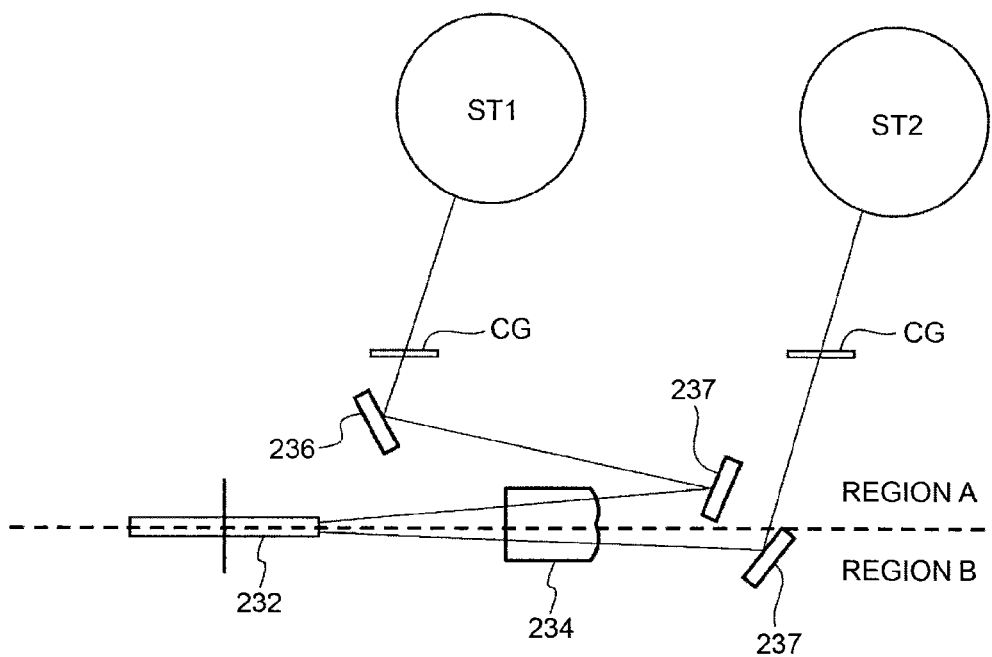
FIG. 11 is a diagram illustrating an example of a plurality of light beams passing through a scanning lens (one surface of which is a special surface) to obliquely strike the deflector of the optical scanning device.

In FIG. 10, light beams deflected by the light deflector 232 are light beams parallel to the normal of the light deflector 232. Alternatively, as illustrated in FIG. 11, the special surface may be applied to a double-layer lens in an oblique incidence optical system.

According to an aspect of the embodiments, degradation in quality in output images can be prevented even when an optical scanning device includes a scanning lens that has refractive index gradient.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source that emits a light beam;
   a deflector that deflects the light beam emitted from the light source in a main-scanning direction; and
   a scanning/image-forming optical system that includes a scanning lens that causes the light beam deflected by the deflector to converge to a scanned surface to form an image on the scanned surface,
   wherein
      the scanning lens has refractive index gradient,
      an incidence surface of the scanning lens is a tilt-decentered surface that has a tilt angle in a sub-scanning direction, the tilt angle depending on a position in the main-scanning direction, and
      the tilt angle is set so as to compensate for variation in direction of the light beam in the sub-scanning direction, the variation resulting from the refractive index gradient,
   wherein an emission surface of the scanning lens has a plurality of meridional lines and has a curvature in the sub-scanning direction.

2. The optical scanning device according to claim 1, wherein the tilt-decentering angle of the incidence surface increases from a portion near center of the scanning lens to outer periphery of the scanning lens, or vice versa.

3. The optical scanning device according to claim 1, wherein the light beam emitted from the light source unit passes through the scanning lens without passing through or across an optical axis of the scanning lens.

4. The optical scanning device according to claim 1, wherein a plurality of light beams passes through the scanning lens.

5. The optical scanning device according to claim 1, wherein the light beam emitted from the light source is oblique in the sub-scanning direction with respect to normal of a deflective reflection facet of the deflector.

6. An image forming apparatus comprising:
   an image carrier; and
   an optical writing device that performs optical writing on the image carrier to form an electrostatic latent image on the image carrier by electrophotography,
   wherein the optical writing device includes:
      a light source that emits a light beam;
      a deflector that deflects the light beam emitted from the light source in a main-scanning direction; and
      a scanning/image-forming optical system that includes a scanning lens that causes the light beam deflected by the deflector to converge to a scanned surface to form an image on the scanned surface
   wherein
      the scanning lens has refractive index gradient,
      an incidence surface of the scanning lens is a tilt-decentered surface that has a tilt angle in a sub-scanning direction, the tilt angle depending on a position in the main-scanning direction, and
      the tilt angle is set so as to compensate for variation in direction of the light beam in the sub-scanning direction, the variation resulting from the refractive index gradient,
   wherein an emission surface of the scanning lens has a plurality of meridional lines and has a curvature in the sub-scanning direction.

7. The image forming apparatus according to claim 6, wherein
   the image carrier includes at least two image carriers, and
   the optical writing device performs optical writing on the at least two image carriers.

* * * * *